United States Patent

Andrews, Jr.

[15] 3,660,675

[45] May 2, 1972

[54] TRANSMISSION LINE SERIES TERMINATION NETWORK FOR INTERCONNECTING HIGH SPEED LOGIC CIRCUITS

[72] Inventor: John R. Andrews, Jr., Framingham, Mass.

[73] Assignee: Honeywell Inc., Minneapolis, Minn.

[22] Filed: May 5, 1970

[21] Appl. No.: 34,675

[52] U.S. Cl. ..............................307/208, 307/106, 307/215, 328/56, 328/67, 333/29

[51] Int. Cl. ..............................H03k 19/36

[58] Field of Search..................307/104, 106, 208, 214, 215; 328/66, 67, 56, 65, 216

[56] References Cited

UNITED STATES PATENTS

| | | | |
|---|---|---|---|
| 3,522,444 | 8/1970 | Lourie | 307/215 X |
| 2,894,153 | 7/1959 | Glomb | 307/106 |
| 2,763,841 | 9/1956 | Simkins | 333/29 |
| 2,837,638 | 6/1958 | Frink | 328/67 |
| 3,383,526 | 5/1968 | Berding | 328/67 X |
| 3,440,440 | 4/1969 | Prohofsky et al. | 307/215 X |
| 3,519,851 | 7/1970 | Groner | 307/208 X |
| 3,491,251 | 1/1970 | Witsell | 307/215 |
| 3,302,035 | 1/1967 | Greene | 307/208 X |

*Primary Examiner*—Donald D. Forrer
*Assistant Examiner*—R. C. Woodbridge
*Attorney*—Fred Jacob and Ronald T. Reiling

[57] ABSTRACT

A series termination network interconnects high speed logic circuits in a transmission line system for transmitting binary ONE and binary ZERO information. When the logic circuit drives the transmission line to a high voltage state, a first impedance branch of the termination network applies a voltage whose magnitude approximates one half of the magnitude of voltage which defines a binary "ONE." When the logic circuit switches the line to a low voltage state, corresponding to a binary ZERO, the network through a second impedance branch terminates the line in its characteristic impedance.

17 Claims, 6 Drawing Figures

INVENTOR
JOHN R. ANDREWS, JR.
BY Faith F. Driscoll
ATTORNEY

TRANSMISSION LINE SERIES TERMINATION NETWORK FOR INTERCONNECTING HIGH SPEED LOGIC CIRCUITS

BACKGROUND OF THE INVENTION

This invention relates to logic arrangements and, in particular, to an improved arrangement for interconnecting remotely located logic circuits.

In high speed digital computer systems employing integrated circuits, it becomes particularly desirable to utilize similar logic circuit configurations for performing logical functions and driving close and remote logic circuits to minimize development costs.

One problem encountered is selecting a logic circuit with sufficiently high noise margin for driving remotely located logic circuits via a transmission line which characteristically provides a noisy environment. Moreover, noise margin becomes particularly important when a logic circuit must drive a transmission line load driven from a single ended output in which instance ground is used as a signal return. Here, the voltage seen at the receiving end becomes the output voltage of the logic driving the line plus any noise voltage induced in this signal line. Thus, for proper operation, the noise margins of the transmitter-receiver logic circuits should be equal to the maximum expected noises from both sources.

While various types of digital logic circuits have been developed for fabrication as integrated circuits, of these, the so called transistor-transistor type logic (TTL) has become widely accepted because of the availability of certain circuits having high noise margins, favorable switching speeds, low power dissipation, fan-out, and the ability to drive a capacitive load. The term fan-out as used herein defines the number of succeeding logic circuits which can be driven in parallel from the output of a logic circuit. To retain the high noise margin of the receiver logic circuit, its threshold is adjusted to a point midway between voltage levels representative of a logic ZERO and a logic ONE. Since transmission lines in these systems are terminated in their characteristic impedance to eliminate noise caused by reflections, the logic circuits normally are constructed to include internally a series impedance whose value approximates the transmission line characteristic impedance.

One problem with the above arrangement is that the internally connected series impedance reduces the amount of voltage the driver logic circuit can supply to the transmission line load.

Further, in a transmission line system, the voltage received by the receiver logic circuit which appears as an open circuit, approximates twice or double the voltage applied by the driver logic circuit. Hence, any reduced level is doubled at the receiver end and is less in magnitude than the voltage level which corresponds to a binary ONE. Normally, the voltage threshold of the receiver logic circuit must be adjusted to respond to this lower value of voltage. This in turn reduces the noise margin of the receiver circuit and limits severly the variation in threshold adjustments which can be made for noise. One result is that the ground noise or voltage induced from the lines of other sources may cause erroneous operation and possible double switching of the receiver logic circuit thereby resulting in erroneous output logic levels therefrom.

In addition to providing a series terminating impedance, some logic arrangements utilize a shunt termination. This termination includes an impedance in the form of a resistor connected in shunt at the output of the driver logic circuit and having a value to terminate the line resistively in its characteristic impedance which is usually quite low. This type of termination increases power dissipation and therefore is not particularly suitable for integrated circuits.

OBJECTS AND SUMMARY OF THE INVENTION

Accordingly, it is an object of this invention to provide an improved arrangement for interconnecting logic circuits that are not located close to one another.

It is another object of this invention to provide an interconnecting arrangement in which noise induced on interconnecting lines does not cause erroneous operation of the receiver logic circuit.

It is a further object of this invention to provide an improved series termination network for terminating the transmission line load in its characteristic impedance without reducing the output voltage applied by the driver logic circuit.

It is a more specific object of this invention to provide a high speed driver logic circuit having a cascode or totem pole output stage for driving high speed logic circuits located remote and near to the driving logic circuit.

The above and other objects are provided according to the basic concept of this invention through an interconnecting network arrangement for driving a transmission line. A driver logic circuit applies a bilevel or two state output logic signal to an input terminal of the transmission line through a first branch of a series termination network. The driver logic circuit is preferrably of the transistor-transistor logic (TTL) type having a cascode or totem pole output stage. To prevent reflections, the series network terminates the transmission line through a second branch connected between the input terminal of the transmission line and the output terminal of the logic circuit.

In greater detail, when the driver logic circuit applies a binary ZERO level to the line, the value of the series impedance including the output impedance of the circuits output stage of the logic circuit equals the characteristic impedance of the transmission line. Hence, the transmission line is terminated in an impedance value which prevents reflections.

When the driver logic circuit switches its output to a binary ONE voltage level, the first branch of the series network together with the driver output stage applies a voltage level which equals one half the voltage level corresponding to the binary ONE. Accordingly, when this voltage level is received by the receiver logic circuit, its doubled value has a voltage level corresponding to a binary ONE. This allows the threshold of the receiver logic circuit to be adjusted to provide high noise margin. Furthermore, the combined impedances of the logic output stage and the first branch of the series network terminate the transmission line in an impedance value which prevents reflections.

The above and other objects of this invention are achieved in an illustrative embodiment described hereinafter. Novel features which are believed to be characteristic of the invention, both as to its organization and method of operation, together with further objects and advantages thereof will be better understood from the following description considered in connection with the accompanying drawings. It is to be expressly understood, however, these drawings are for the purpose of illustration and description only and are not intended as a definition of the limits of the invention.

DESCRIPTION OF THE PREFERRED EMBODIMENT

Figure 1:
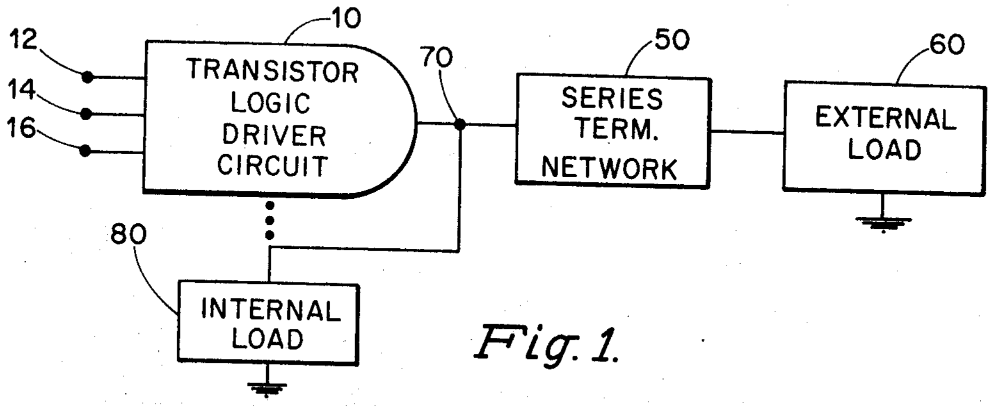
FIG. 1 shows in block diagram form a system incorporating the invention.

FIG. 1 shows, in block diagram form, a high speed transistor logic circuit 10 of integrated circuit construction which in response to any one of three inputs 12, 14, and 16 drives an internal load 80 and an external load 60 through a series termination network 50. For the purposes of the present invention, an internal load is a load which does not form part of the logic circuit 10 (i.e. not part of the integrated circuit chip) but which is located within distances of several inches of the circuit 10. By contrast, an external load is a load which is remotely located from the circuit 10 at distances up to 200 feet.

Figure 1A:
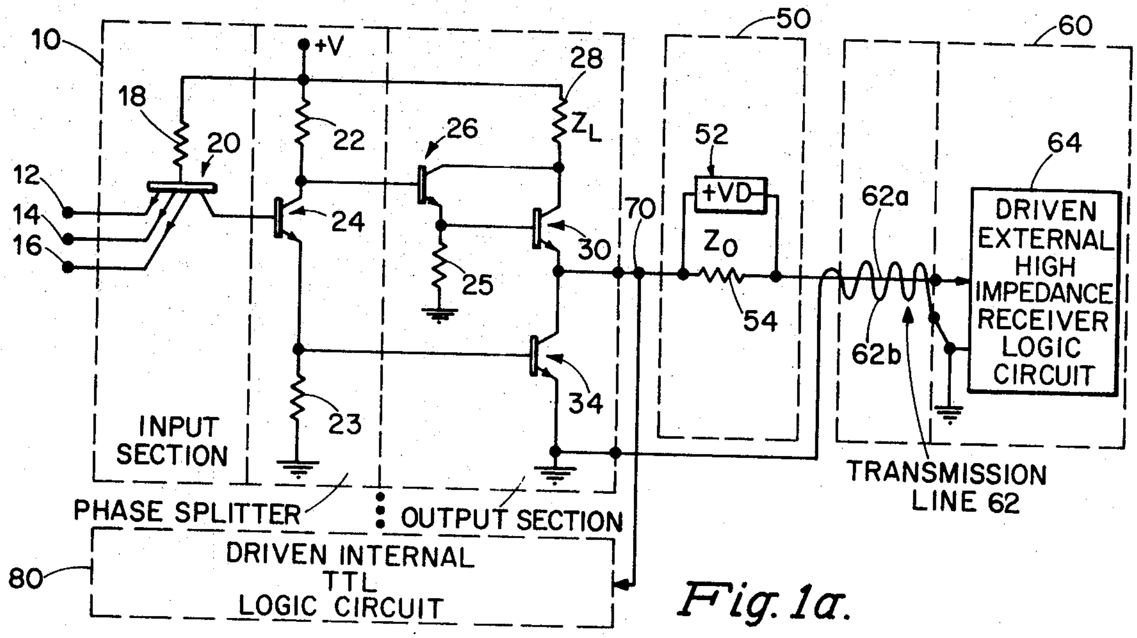
FIG. 1*a* shows in greater detail, a preferred embodiment of the system of FIG. 1.

The arrangement of FIG. 1 is shown in greater detail in FIG. 1*a*. The transistor logic driver circuit 10 employs a three input TTL NAND logic circuit. As shown, the logic circuit 10 has an input section, a multi-emitter NPN transistor 20 which drives a phase splitter transistor 24 which provides complementary output signals for driving a cascode or totem pole output section.

From its output terminal 70, logic circuit 10 drives an external transmission line load 60 and one or more closely located logic circuits which comprise the load 80. Through the series termination network 50, the logic circuit 10 drives one end of the two conductor transmission line 62 which connects at its other end to a remotely located high impedance receiver logic circuit 64. The high impedance logic circuit 64 can include well-known emitter follower circuits, current mode logic circuits, or transistor-transistor logic circuits, each having an input impedance much greater than the characteristic impedance Zo of the transmission line.

Figure 2A:
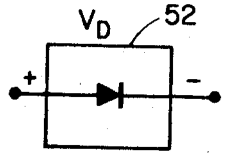
FIG. 2 shows one form of one element of the series termination network of FIG. 1*a;*
FIG. 2*b* shows another form of the same one element of the series termination network of FIG. 1*a;*
Figure 2B:
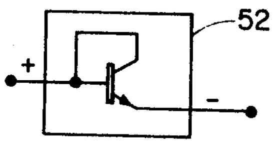

The network 50 includes two elements 52 and 54 having a non-linear impedance and linear impedance respectively. In its simplest form, the non-linear impedance of network 50 includes a uni-directional element which may take the form of a diode or transistor shown in FIGS. 2*a* and 2*b* respectively.

In greater detail, the driving TTL logic circuit 10 comprises an AND gate having a multi-emitter transistor 20 with its three emitter electrodes connected to input terminals 12, 14, and 16. The base electrode of transistor 20 connects through a series impedance in the form of a resistance 18 to positive voltage source, +V. The collector electrode of transistor 20 drives a base electrode of a phase splitter transistor 24. The transistor 24 has its collector electrode connected through an impedance in the form of collector resistance 22 to the source +V. Its emitter electrode connects to a pull-down impedance shown as resistance 23 in FIG. 1*a*. The transistor 24 supplies a pair of complementary output signals to an output section of the logic circuit 10.

The output section of logic circuit 10 includes an upper and lower portion. The lower portion includes a first NPN transistor 34 which has its base electrode connected to the emitter electrode of the transistor 24, its emitter electrode connected to ground, and its collector electrode connected to output terminal 70 of the logic circuit 10.

The upper portion of the output section includes a pair of NPN transistors 26 and 30 serially connected in a darlington circuit configuration, the emitter electrode output of which connects to the output terminal 70. In greater detail, transistor 30 has its base electrode connected to the emitter electrode of transistor 26 which is connected through a resistance 25 to ground. The collector electrodes of transistors 26 and 30 connect to the positive voltage source +V through a pull-up load impedance $Z_L$ which corresponds in the preferred embodiment to a resistance 28. The base electrode of transistor 26 connects to the collector electrode of transistor 24.

The transistor 30 provides an "active pull-up" which makes the logic circuit 10 suitable for driving large capacitive loads without incurring large propagation delays. The resistance 28 connects in series to a voltage source +V for limiting the amount of current through the transistor 30 in the event that the emitter electrode of the transistor 30 is inadvertently grounded. Hence, this arrangement provides short circuit protection.

BRIEF DESCRIPTION OF OPERATION OF LOGIC CIRCUIT 10

Briefly, the NAND logic circuit 10 of FIG. 1*a* operates in the following manner. When any one of the input terminals 12, 14, or 16 are at a low voltage level, as for example, a voltage level of 0.2 volts being representative of a binary ZERO, current flows from the source +V through resistance 18 and through the emitter electrode of transistor 20 into a driving source, not shown. Since the voltage difference between the emitter electrode and collector electrodes of transistor 20 is very small, the low voltage level applied to one of the terminals is also applied to the base of phase splitter transistor 24. This low voltage level decreases conduction greatly through transistor 24. The voltage at the collector electrode at transistor 24 rises to a high voltage level while the voltage level at the emitter electrode decreases to low voltage level.

The complementary voltage levels at the collector and emitter electrodes of phase splitter transistor 24 are applied respectively to the base electrodes of transistors 26, and 34. Accordingly, the high voltage level which approximates the supply voltage +V, causes the transistor 26 to conduct. This in turn increases the voltage level at the emitter electrode of transistor 26 to a value of the collector voltage of transistor 24 decreased by the voltage drop across the base-emitter diode (Vbe) of the transistor 26. This voltage is applied to the base electrode of transistor 30, switching it into conduction. At the same, the low voltage level, applied to the base electrode of pull-down transistor 34, renders it non-conductive. Thus, the transistor 34 presents a high impedance between the terminal 70 and ground. The voltage level corresponding to a binary ONE applied by logic circuit 10 at the output terminal 70 is established by the voltage drop across the base emitter diode of voltage setting transistor 30.

When the input terminals 12, 14, and 16 are all switched to a high voltage level, as for example, a voltage level of 3.3 volts being representative of a binary ONE, the current from the supply voltage +V no longer flows through the resistance 18 because all of the emitter-base diodes of the transistor 20 are reversed biased. As the flow of current through resistance 18 decreases, the voltage level applied to the base electrode of phase splitter transistor 24 increases which in turn increases greatly conduction through the transistor 14. The increased current flow through transistor 24 and its series connected resistances 22 and 23 lowers and raises respectively the voltage levels at its collector and emitter electrodes. The transistor 34 is driven into conduction providing a low impedance path between the output terminal 70 and ground. This establishes a low voltage level, binary ZERO, at the output terminal 70. The voltage level at the base electrode of voltage setting transistor 30 is such as to insure that it is non-conductive, maintaining the output terminal 70 at the binary ZERO level.

The low and high voltage levels representative respectively of a logic ZERO and ONE produced by logic circuit 10, are applied through termination network 50 to one end of conductor 62*a* of transmission line 62 for reception at the other end by high impedance receiver logic circuit 64. The conductor 62*b* provides a ground return for logic signals transmitted between logic circuits 10 and 64.

As mentioned previously, the voltage levels received by logic circuit 64 are doubled in value because the input impedance of logic circuit 64 appears as an open circuit in comparison to the low impedance of the transmission line 62.

TERMINATION NETWORK

Figure 3A:
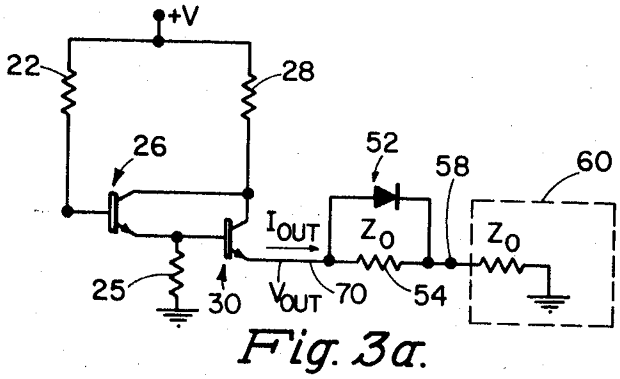
FIG. 3*a* shows a portion of the circuitry of the system of FIG. 1*a* which will be used in explaining the operation of the present invention; and, FIG. 3*b* shows a voltage-current characteristic curve of portion of the output circuit of FIGS. 1*a* and 3*a*.
Figure 3B:
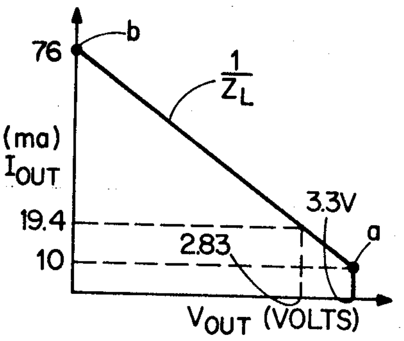

Details concerning the operation of network 50 will be described in connection with FIGS. 3*a* and 3*b*. FIG. 3*a* shows an equivalent circuit arrangement of the output sections, series network 50 and transmission line 62 of FIG. 1*a* with corresponding reference numerals in FIG. 1*a* indicated. In the high voltage state, the circuit 10 includes a resistance 28 in series with darlington emitter follower transistors 26 and 30 driving a load 60 through network 50 and to ground. The load 60 has an impedance value $Z_o$ equivalent to the characteristic impedance of the transmission line 62. Looking back into the circuit from terminal 70, an impedance having the characteristic shown in FIG. 3b is seen. Specifically, FIG. 3b shows the $V_{out}$ is $I_{out}$ graph for a typical TTL logic circuit.

At zero current, the logic circuit typically provides an output voltage of 3.3 volts. The darlington circuit provides a low driving impedance (i.e. almost zero) until point a is reached. As shown, the driving impedance changes when the circuit supplies more than 10 ma. of current. That is, the darlington circuit is saturated and with further increases in current, the driving impedance approximates the value of collector load resistance 28 which includes the saturation resistance of the transistor 30.

The point b corresponds to the value of maximum current or so-called short circuit current. This value of current is calculated by subtracting the voltage drop across the darlington circuit (i.e. Vce sat.) from the supply voltage, +V, and dividing by the value of collector resistance. Assuming typical values, I short circuit is:

I short circuit = [5V(+V)−1.2V(Vce sat.)] 1/50=76 ma.

In the preferred embodiment, the value of collector resistance 28 selected provides adequate short circuit protection and sufficient output voltage and output current for driving transmission line load 60 and internal load 80. Moreover, the value of collector resistance 28 and non-linear impedance 52 of network 50 together terminate transmission line 62 so as to prevent reflections.

The value of impedance 54 of network 50 is selected to approximate the characteristic impedance Zo of the line 62. The reason is that when the output level at terminal 70 switches from a binary ONE to a binary ZERO (i.e. high voltage level to low voltage level), the impedance of the circuit 10 is very low. That is, the impedance corresponds to the very low output impedance of the collector-emitter path of saturated transistor 34. When the circuit is in its low voltage state, binary ZERO, diode 52 is reversed biased providing a high impedance to transmission line 62. Therefore, the impedance 54 of network 50 series terminates the transmission line 62 in its characteristic impedance.

Now, when the logic circuit 10 switches from its low voltage state to its high voltage state (i.e. binary ONE), the network 50 under typical conditions is required to supply one half the voltage level of a binary or logic ONE. This produces at the receiver circuit 64 a voltage level which corresponds to a binary ONE.

It is assumed, by way of example only, that a binary ONE and binary ZERO have the following typical voltage levels at the receiver inputs.

a logic ONE = 3.3 volts, and
a logic ZERO = 0.2 volts.

Under typical conditions, one half the voltage level of a logic ONE is 1.65 volts. The line voltage, $V_L$, for a logic ONE at the input to line 62 corresponds to the voltage level when the line is at a binary ZERO (i.e. steady state voltage V sat.) plus one half the difference in voltage levels between a binary One and a binary ZERO (i.e. transient voltage levels). This produces a full logic ONE value of 3.3 volts at the receiver 64. Therefore, $V_L$ equals:

$V_L = V$ sat. +½(V "logic ONE" −V"logic ZERO"); and (1)
$V_L$ = 0.2 volts +½(3.3 volts −0.2 volts) or
$V_L$ = 1.75 volts.

Assuming that the characteristic impedance $Z_o$ of the line 62 is 80 ohms, the value of current, $I_{out}$, the circuit 10 provides initially to the load $Z_o$ is calculated as follows:

$DV_L/Z_o$aqx(1.75 volts −0.2 volts)/80=19.4 milliamperes (ma.).

As indicated, the change in line voltage, $DV_L$, corresponds to the difference between the voltage level that the output load $Z_o$ is rising toward, i.e. 1.75 volts, and the voltage level the load $Z_o$ was previously at which is saturated voltage of transistor 34 (i.e. V sat.) corresponding to a binary ZERO.

The circuit 10 must supply a line voltage, $V_L$, whose value is at least 1.75 volts for providing the desired value of current to the transmission line load, $Z_o$. Therefore, the network 50 is required to apply the same voltage level of 1.75 volts to the load $Z_L$ when the logic circuit 10 is in its high voltage state.

Since the diode 52 of the network 50 is forward biased when the logic circuit 10 is in its high voltage state, the voltage, $V_{out}$, at terminal 70 should equal:

$$V_{out} = V_L + V_D \text{ wherein} \quad (2)$$
$$V_{out} = 1.75 \text{ volts} + 0.8 \text{ volts or}$$
$$V_{out} = 2.55 \text{ volts.}$$

Referring now to FIG. 3b, it is seen graphically that the voltage supplied by the circuit 10 having the $V_{out}/I_{out}$ characteristic shown (i.e. collector impedance of 50 ohms) is 3.3 volts, more than the required 2.55 volts. This voltage can be calculated from the equation defining the graph in FIG. 3b. That is, the equation of the line of FIG. 3b which has a slope of 50 (i.e. $1/Z_L$) equals:

$$V = mI + b \quad (3)$$

where M=50 and b=−76m as calculated from the points corresponding to 10 ma., 3.3 volts, and 76 ma. and 0 volts in FIG. 3b. Substituting into equation 3, the value of 19.4 ma. for the current I and solving for V, it is seen that V is:

$$V = 50I + 3.8 \text{ or} \quad (4)$$
$$V = -50(19.4 \text{ ma.}) + 3.8 =$$
$$V = 2.83 \text{ volts.}$$

From the above, it is seen that with the value selected for the collector resistance 28, the network 50 applies a voltage level, $V_L$, more than sufficient for driving the transmission line load, $Z_o$, at the required current values. While impedance values less than that selected, also provide a similar driving capability, it is preferred to use an impedance which limits sufficiently the maximum current I short circuit through transistor 30 in the event of a short circuit and which prevents reflections.

In summary, the network 50 by having a diode 52 connected in parallel with resistance 54 increases the amount of voltage the logic circuit 10 applies to the input of the transmission line 62 when the circuit is in its high voltage or binary ONE state. Without the diode 52 or its equivalent connected as shown, the logic circuit 10 is unable to supply the desired voltage level at the typically higher current levels required to drive the transmission line 62. The reason is that without network 50, the circuit 10 is required to supply the same value of current through a series impedance 54 of value $Z_o$ and a characteristic or surge load impedance 60 of value $Z_o$. Because the network 50 supplies a voltage level which is one half the voltage level of a logic to the input of line 62, the receiver logic circuit 64 receives a voltage level which equals full logic ONE. This increases the noise margin of the receiver circuit 64 and permits flexibility in adjusting its voltage threshold for noise. Additionally, the non-linear impedance of conductive diode 52 together with the impedance of resistance 28 absorbs energy thereby preventing reflections.

As mentioned, when in the high voltage state, the circuit 10 applies a voltage level to output terminal 70 which approximates 0.8 volts or is one diode voltage drop above one half the voltage level of a binary ONE. This voltage level has been found to provide sufficient noise margin for driving several TTL logic circuits referenced as load 80 in FIGS. 1 and 12 positioned within the immediate vicinity thereof (e.g. positioned within distances of several inches in contrast to distances of up to 200 feet).

In accordance with the teachings of the invention, the typical $V_{out}$ vs $I_{out}$ characteristics of a transistor-transistor logic circuit are adapted by a series termination network to be compatible with the high noise margin and driving requirements of a line driver circuit. The values of components in a typical embodiment are set forth herein below.

| | |
|---|---|
| Resistance 18 | 4000 ohms |
| Resistance 22 | 800 ohms |
| Resistance 23 | 800 ohms |
| Resistance 25 | 3500 ohms |
| Resistance 28 | 50 ohms |

| | |
|---|---|
| Diode 52 | threshold+.8 volts Fairchild FD–624 |
| Resistance 54 | 80 ohms |
| Twisted pair Transmission line 62 | 80 ohms 1.3 nanoseconds per foot |
| Supply voltage +V | 5 volts |

The above values are provided for the purpose of illustration only and should not be construed to limit the scope of the present invention. For example, the interconnection arrangement of the present invention is not limited to the type of TTL logic circuit disclosed or the driving arrangement shown. Other types of logic circuits including amplifiers flip-flops can be used in combination with the techniques of the present invention. Some of these circuits are described at pages 54–59 of a publication titled Honeywell Computer Journal, Winter-Spring 1968, Copyright 1968. Also, instead of driving a transmission line load from a single ended arrangement, the invention also can be utilized with double ended or differential balanced line driving arrangements.

Other changes will also appear to those skilled in the art. For example, changes in polarities of voltage sources in values of impedances 54 and $Z_L$, and in transistor types, in addition to substituting equivalents for element 52 may be made.

While in accordance with the provisions and statutes there has been illustrated and described the best form of the invention known, certain changes may be made in the circuits described without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. A driver circuit for driving an external transmission line load having a load impedance value much greater than the transmission line characteristic impedance, said driver circuit comprising in combination:

a logic circuit having at least first and second states;

a series termination network connecting said logic circuit in series with said external transmission line load; and, said series termination network including at least first and second impedance branches, said network being connected to be conditioned by said logic circuit to apply a predetermined voltage level to said external load through said first impedance branch when said logic circuit is in said first state and said network being connected to be conditioned by said logic circuit when in said second state so as to terminate said external transmission line load in its characteristic impedance through said second impedance branch to absorb reflections from said transmission line load.

2. A driver circuit for applying a bilevel voltage output signal to the input of a transmission line whose output is coupled to at least one receiver circuit whose input impedance is much greater than the characteristic impedance of said line, said driver circuit comprising:

a high speed transistor logic circuit including an output logic circuit;

a series network means, one end of said means being connected to said logic output circuit and the other end of said means being connected to said input of said transmission line, said network means including first and second impedance means connected in parallel; and, said series network means being connected to be conditioned by a first level output of said output logic circuit to apply said first voltage level through said first impedance means to said input of said transmission line and said series network means being connected to be conditioned by a second voltage level output of said output logic circuit so as to terminate said line through said second impedance means and said output logic circuit by changing the impedance of said network means so as to absorb reflections from said line produced by said receiver circuit.

3. The driver circuit according to claim 2 wherein said first and second impedance means respectively include a unidirectional non-linear impedance and a linear impedance and said output logic circuit includes first and second transistors connected in a Darlington circuit having a first output connected to a voltage source and a second output in series with a third transistor connected to a point of reference potential; and said second output being connected to said one end of said network means whereby said first voltage level is established by said Darlington circuit and said second voltage level is established by the conduction of said third transistor.

4. The driver circuit of claim 1 wherein said circuit is of the transistor-transistor logic type.

5. The transmission line driver circuit of claim 4 wherein said first impedance branch includes a non-linear impedance and said second impedance branch includes a linear impedance.

6. The driver circuit of claim 5 wherein said non-linear impedance is an uni-directional element.

7. The circuit of claim 6 wherein said uni-directional element is a diode.

8. The circuit of claim 5 wherein said linear impedance is a resistance having a value which approximates the characteristic impedance of said transmission line load.

9. The circuit of claim 3 wherein said driver output circuit further includes a load impedance connected between said first output and said voltage source.

10. The circuit of claim 9 wherein said load impedance is a resistance which has a value less than the characteristic impedance of said line, said value being selected to provide a predetermined voltage at currents for driving said line and for short circuit protection, said value together with said non-linear impedance value minimizes reflections from said driver output by providing an impedance whose value approximates the characteristic impedance of said line.

11. The circuit of claim 2 wherein said first output level applied to said one end of said network means approximates one half the voltage level corresponding to a binary ONE so as to cause said first output level to be doubled in value when received by said receiver circuit and correspond to a full binary ONE.

12. The circuit of claim 2 wherein said first output level equals said output voltage level, $V_{out}$ minus the voltage drop $V_d$ across said first impedance means.

13. A logic transmission line system comprising:

a transmission line having an input end, a remote end and a predetermined characteristic impedance;

a plurality of receiver logic circuits connected to said line with at least one of said receiver logic circuits being connected to said remote end of said transmission line, each of said receiver logic circuits having an input impedance much greater than said characteristic impedance;

a driver logic circuit for producing high and low voltage levels at its output in response to input voltage levels representative of binary ONE and binary ZERO information, said driver logic output circuit including first and second transistors connected in a Darlington circuit arrangement having a first output connected through a load impedance to a voltage source, and a second output connected through the collector-emitter path of a third transistor to a point of reference potential;

termination network means, said network means connecting said second output in series with said input end of said transmission line and said network means including at least first and second branches connected in parallel, said first branch having a non-linear impedance element connected to present a low impedance to said high voltage levels and a high impedance to said low voltage levels and said second branch having a linear impedance element; and, said driver logic circuit when switched by one of said input voltage levels being operative to apply said high voltage level through said second darlington circuit output and said nonulinear impedance to said input end of said transmission line, said driver logic circuit when switched by the other of said input levels being operative to apply said low voltage level to said network means so as to terminate said transmission line at said input end in its characteristic impedance through said linear impedance element and said third transistor collector-emitter path and absorb reflections from said receiver logic circuit.

14. The system according to claim 13 wherein said non-linear impedance element is a diode and said first voltage level is of a magnitude which equals one half the voltage level representative of a binary ONE whereby said first voltage level received by said one of said driven logic circuits is doubled in value and corresponds to a full binary ONE.

15. The system according to claim 13 wherein said driver logic circuit and said driven receiver logic circuits are of the transistor-transistor logic type with one of said receiver logic circuits being connected in common with said driver circuit second output.

16. The system according to claim 13 wherein said load impedance means is a resistance which has a value less than the characteristic impedance of said line, said value being selected to provide voltage level at said one end of said line which is one half the magnitude of the voltage level representative of a binary ONE at currents for driving said line and said value which when combined with the impedance value of said non-linear impedance element terminates said line in a value of impedance which prevents reflections.

17. The system according to claim 16 wherein said transmission line is a twisted pair conductor line.

* * * * *